United States Patent
Hinze et al.

(10) Patent No.: US 10,030,641 B2
(45) Date of Patent: Jul. 24, 2018

(54) VALVE SYSTEM

(71) Applicant: Cummins Emission Solutions, Inc., Columbus, IN (US)

(72) Inventors: Dirk Hinze, Remlingen (DE); Kay Schmidt, Lohr a. Main (DE); Thomas Betz, Tauberbischofsheim (DE)

(73) Assignee: CUMMINS EMISSION SOLUTIONS, INC., Columbus, IN (US)

( * ) Notice: Subject to any disclaimer, the term of this patent is extended or adjusted under 35 U.S.C. 154(b) by 257 days.

(21) Appl. No.: 14/658,762

(22) Filed: Mar. 16, 2015

(65) Prior Publication Data

US 2016/0273672 A1    Sep. 22, 2016

(51) Int. Cl.
| F04B 39/10 | (2006.01) |
| F01N 3/20 | (2006.01) |
| F04B 53/10 | (2006.01) |
| F16K 15/14 | (2006.01) |
| F16K 15/16 | (2006.01) |

(52) U.S. Cl.
CPC ........ *F04B 39/1033* (2013.01); *F01N 3/2066* (2013.01); *F04B 53/1055* (2013.01); *F16K 15/14* (2013.01); *F16K 15/16* (2013.01); *F01N 2610/02* (2013.01); *F01N 2610/1433* (2013.01); *Y02T 10/24* (2013.01)

(58) Field of Classification Search
CPC .............. F04B 53/1042; F04B 53/1045; F04B 39/102; F04B 39/1033; F04B 39/104; F04B 53/1055; F04B 53/1087; F16K 15/14; F16K 15/16; F16K 31/12; F01N 3/2066; F01N 2610/1433
See application file for complete search history.

(56) References Cited

U.S. PATENT DOCUMENTS

| 3,424,091 | A | * | 1/1969 | Turner ................... F02M 37/12 |
| | | | | 261/DIG. 68 |
| 4,468,222 | A | * | 8/1984 | Lundquist ......... A61M 5/14216 |
| | | | | 417/236 |
| 2011/0280755 | A1 | | 11/2011 | Wackerle et al. |

* cited by examiner

*Primary Examiner* — Kenneth J Hansen
(74) *Attorney, Agent, or Firm* — Foley & Lardner LLP

(57) ABSTRACT

A valve comprising a base plate defining an inlet and outlet passageway. A cover plate is disposed on the base plate and defines a first and second channel. A pressure plate is disposed on the base plate and includes a first anchoring portion, a first sealing portion, and a first biasing portion connecting the first anchoring portion and the first sealing portion. Furthermore, a suction plate is disposed on the base plate and includes a second anchoring portion, a second sealing portion, and a second biasing portion connecting the second anchoring portion to the second sealing portion. The valve is movable between a first configuration, where the first sealing portion is distal to first channel and the second sealing portion is proximal to inlet passageway, and a second configuration, in which the first sealing portion is proximal to first channel, and second sealing portion is distal to inlet passageway.

11 Claims, 8 Drawing Sheets

US 10,030,641 B2

VALVE SYSTEM

TECHNICAL FIELD

The present disclosure relates generally to valves and pumps for pumping fluid.

BACKGROUND

Exhaust aftertreatment systems are used to receive and treat exhaust gas generated by internal combustion (IC) engines. Conventional exhaust gas aftertreatment systems include any of several different components to reduce the levels of harmful exhaust emissions present in exhaust gas. For example, certain exhaust aftertreatment systems for diesel-powered IC engines include a selective catalytic reduction (SCR) catalyst to convert NOx (NO and the $NO_2$ in some fraction) into harmless nitrogen gas ($N_2$) and water vapor ($H_2O$) in the presence of ammonia ($NH_3$).

The ammonia used by the SCR system for reducing the exhaust gas is generally provided in the form of a liquid exhaust reductant. The liquid exhaust reductant is stored in an exhaust reductant tank and communicated into the SCR system from the tank via a pump. Pumps used aftertreatment should preferable have a small form factor, be robust and be able to resist corrosion from the exhaust reductant.

SUMMARY

In various embodiments, a valve comprises a base plate defining an inlet passageway and an outlet passageway. The inlet passageway is included in a suction portion of the valve, and the outlet passageway is included in a pressure portion of the valve. A cover plate is disposed on the base plate. The cover plate defines a first channel in the pressure portion and a second channel in the suction portion. A pressure plate is disposed on the base plate in the pressure portion. The pressure plate includes a first anchoring portion, a first sealing portion, and a first biasing portion connecting the first anchoring portion and the first sealing portion. Furthermore, a suction plate is disposed on the base plate in the suction portion. The suction plate includes a second anchoring portion, a second sealing portion, and a second biasing portion connecting the second anchoring portion to the second sealing portion.

The valve is movable between a first configuration and a second configuration. In the first configuration, the first sealing portion of the pressure plate is distal to the first channel and the second sealing portion of the suction plate is proximal to the inlet passageway. In the second configuration the first sealing portion of the pressure plate is proximal to the first channel, and the second sealing portion of the suction plate is distal to the inlet passageway. In particular embodiments, the movement of the first sealing portion and the second sealing portion between the first configuration and the second configuration results in a flexing of the first biasing portion about the first anchoring portion, and a flexing of the second biasing portion about the second anchoring portion, respectively.

In other embodiments, a pump comprises a valve. The valve comprises a base plate defining an inlet passageway and an outlet passageway. The inlet passageway is included in a suction portion of the valve, and the outlet passageway is included in a pressure portion of the valve. A cover plate is disposed over the base plate. The cover plate defines a first channel in the pressure portion and a second channel in the suction portion. A pressure plate is disposed on the base plate in the pressure portion. The pressure plate includes a first anchoring portion, a first sealing portion, and a first biasing portion connecting the first anchoring portion and the first sealing portion. A suction plate is disposed on the base plate in the suction portion. The suction plate includes a second anchoring portion, a second sealing portion, and a second biasing portion connecting the second anchoring portion and the second sealing portion. A membrane is disposed on the cover plate such that the membrane and the cover plate define a chamber therebetween. The pressure portion and the suction portion are in fluidic communication through the first channel and the second channel via the chamber.

The pump is movable between a first configuration and a second configuration. In the first configuration, the membrane is proximal to the cover plate. The first sealing portion of the pressure plate is distal to the first channel such that a fluid is expelled from the chamber into the outlet passageway through the first channel. Furthermore, the second sealing portion of the suction plate is proximal to the inlet passageway and fluidly seals the inlet passageway. In the second configuration, the membrane is distal to the cover plate. The first sealing portion is proximal to the first channel and fluidly seals the first channel. The second sealing portion is distal to the inlet passageway such that the fluid is drawn into the chamber from the inlet passageway via the second channel.

In still other embodiments, an aftertreatment system comprises a selective catalytic reduction system configured to receive an exhaust gas from an engine. The selective catalytic reduction system includes at least one catalyst formulated to reduce the exhaust gas. A storage tank is configured to store an exhaust reductant for providing to the selective catalytic reduction system. A pump is fluidly coupled to the storage tank and the selective catalytic reduction system. The pump is configured to pump the exhaust reductant from the storage tank to the selective catalytic reduction system.

The pump comprises a valve comprising a base plate defining an inlet passageway and an outlet passageway. The inlet passageway is included in a suction portion of the valve, and the outlet passageway is included in a pressure portion of the valve. A cover plate is disposed over the base plate. The cover plate defines a first channel in the pressure portion and a second channel in the suction portion. A pressure plate is disposed on the base plate in the pressure portion. The pressure plate includes a first anchoring portion, a first sealing portion, and a first biasing portion connecting the first anchoring portion and the first sealing portion. A suction plate is disposed on the base plate in the suction portion. The suction plate includes a second anchoring portion, a second sealing portion, and a second biasing portion connecting the second anchoring portion and the second sealing portion. A membrane is disposed on the cover plate such that the membrane and the cover plate define a chamber therebetween. The pressure portion and the suction portion are in fluidic communication through the first channel and the second channel via the chamber.

The pump is movable between a first configuration and a second configuration. In the first configuration, the membrane is proximal to the cover plate. The first sealing portion of the pressure plate is distal to the first channel such that a fluid is expelled from the chamber into the outlet passageway through the first channel. The second sealing portion of the suction plate is proximal to the inlet passageway and fluidly seals the inlet passageway. In the second configuration in which the membrane is distal to the cover plate, the first sealing portion is proximal to the first channel and fluidly seals the first channel. The second sealing portion is distal to the inlet passageway such that the fluid is drawn into the chamber from the inlet passageway via the second channel.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
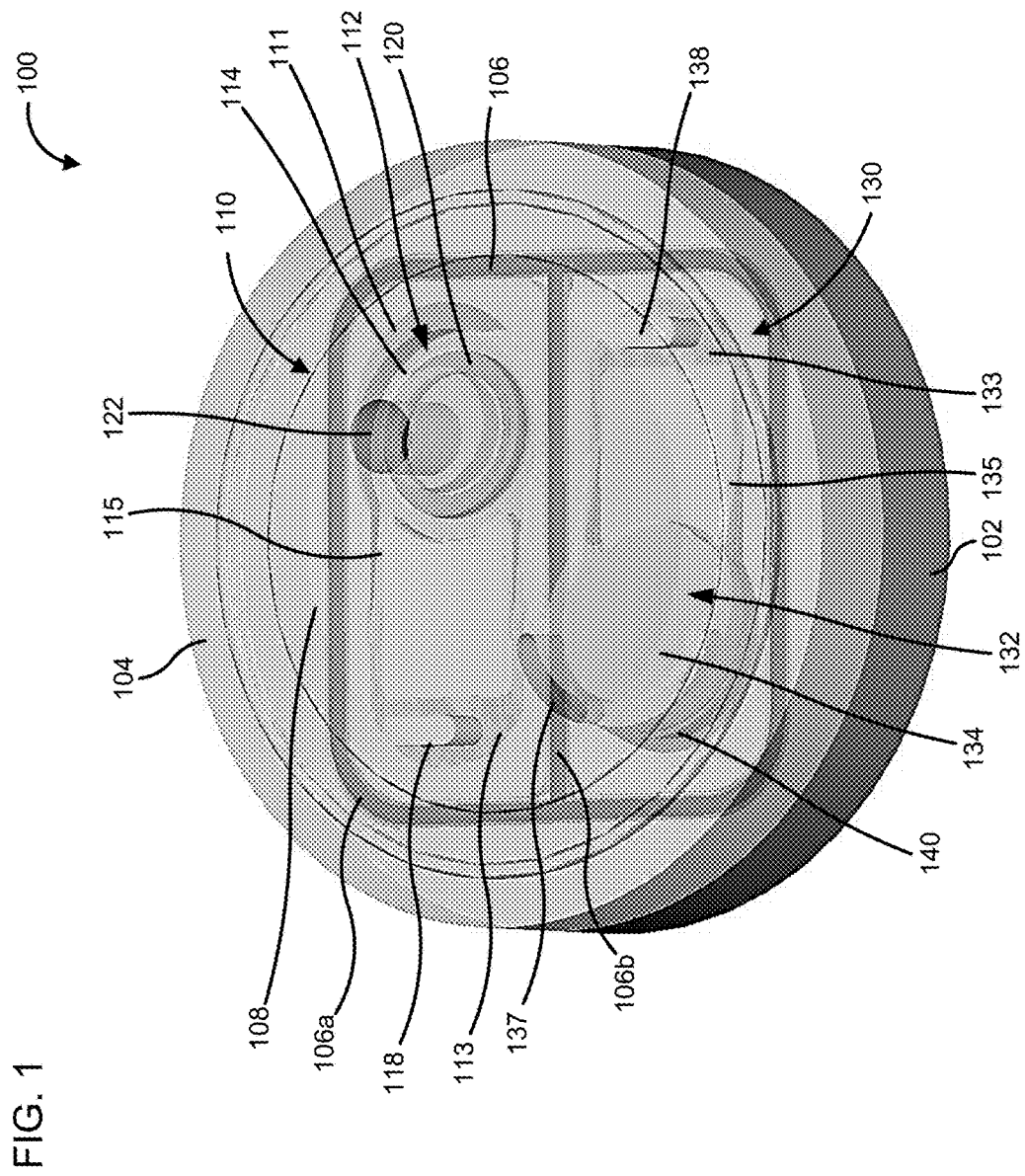
FIG. 1 is a perspective view of a valve that includes a base plate, a cover plate, a pressure plate and a suction plate, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to a valve which can be included in a pump, and in particular to a metal plate valve that includes a first metal plate and second metal plate, which can be moved via suction and pressure in the same direction relative to each other to pump a fluid.

Various embodiments of the metal plate valve described herein may provide several benefits including, for example (1) providing a small package which occupies a relatively small space when included in a system, for example in an aftertreatment system; (2) providing compatibility with existing membrane pumps allowing the valve to be included in conventional pumps; and (3) reducing cost and extending the life of the valve by using a pre-tensioned metal plates for pumping minimizing moving parts.

Figure 2A:
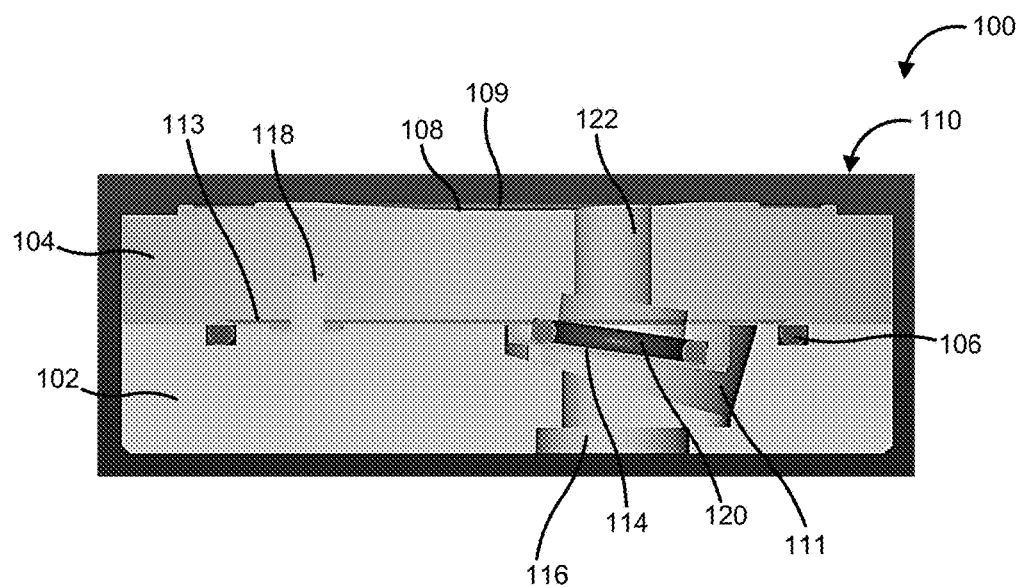
FIG. 2A is a side cross-section view of the pressure portion of the valve of FIG. 1.

FIG. 1 shows a perspective view of a valve 100 which can be included in a pump, for example a pump configured to deliver an exhaust reductant to an SCR system. The valve 100 includes a base plate 102, a cover plate 104, a pressure portion 110 that includes a pressure plate 112, and a suction portion 130 that includes a suction plate 132. FIG. 2A shows a side cross-sectional view of the pressure portion 110, and FIG. 2B shows a side cross-section of the suction portion 130 of the valve 100.

Figure 2B:
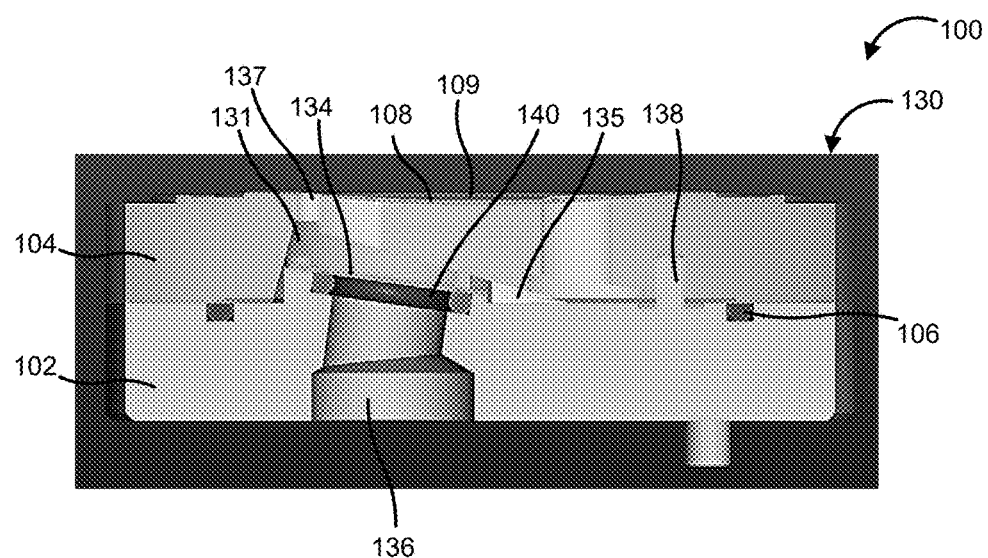
FIG. 2B is a side cross-section view of the suction portion of the valve of FIG. 1.

The base plate 102 defines an inlet passageway 136 and an outlet passageway 116 therethrough (FIGS. 2A and 2B). The inlet passageway 136 is defined in the suction portion 130, and the outlet passageway 116 is defined in the pressure portion 110 of the valve 100. The inlet passageway 136 is configured to receive a fluid (e.g., an exhaust reductant) from a fluid source (e.g., an exhaust reductant tank), and the outlet passageway 116 is configured to expel the fluid from the valve 100 (e.g., to communicate an exhaust reductant to an SCR system).

The base plate 102 can be a machined, molded or casted part and can be formed from any suitable strong, rigid and corrosion resistant material such as metals (iron, aluminum, steel, alloys, etc.), polymers, plastics, any other suitable material or combinations thereof. The base plate 102 can have any suitable shape, for example round, square, rectangular, oval, etc. A first cavity 111 is also defined in the base plate 102 in the pressure portion. The first cavity 111 is configured to receive at least a portion of the pressure plate 112, as described herein, and is in fluidic communication with the outlet passageway 116.

The cover plate 104 is disposed on the base plate 102. The cover plate 104 can be removably coupled to the base plate 102, for example via fasteners such as screws, nuts, bolts, snap-fit mechanism, any other suitable mechanism or combinations thereof. The cover plate 104 can have a shape and which can be substantially similar to the shape of the base plate 102, as described herein. The cover plate 104 can also be formed from a strong, rigid and corrosion resistant material such as metals (iron, aluminum, steel, alloys, etc.), polymers, plastics any other suitable material or combinations thereof.

The cover plate 104 defines a first channel 122 in the pressure portion 110 and a second channel 137 in the suction portion 130. The second channel 137 is aligned with the inlet passageway 136 when the cover plate 104 is coupled to the base plate 102. The second channel 137 is configured to allow the fluid communicated into the base plate 102 via the inlet passageway 136 to be drawn out of the cover plate 104 into a chamber defined between a membrane 109 (FIGS. 2A-2B and FIG. 3) which can be included in a pump (not shown) and a top surface of the cover plate 104. In some embodiments, at least a portion of the cover plate between the first channel 122 and the second channel 137 can define a depression 108. The depression 108 can be structured to cooperate with the membrane 109 disposed on the cover plate 104 to form the chamber between the top surface of the cover plate 104 and the membrane 109. The chamber is configured to allow fluidic communication between the first channel 122 and the second channel 137. Thus, the chamber provides a fluidic path for the fluid to flow from suction portion 130 to the pressure portion 110.

The first channel 122 is aligned with the outlet passageway 116 and is configured to allow fluid drawn into the chamber to be communicated back into the cover plate 104 and into the outlet passageway 116. In this manner, the fluid can be pumped through the valve 100, as described in further detail herein.

The cover plate 104 also defines a second cavity 131 in the suction portion 130. The second cavity 131 is configured to receive at least a portion of the suction plate 132, as described herein and is in fluidic communication with the second channel 137.

A gasket 106 is disposed on the base plate 102 and is positioned between the base plate 102 and the cover plate 104. The gasket can be formed from a flexible and corrosion resistant material, for example rubbers, polymers, plastics, silicone, etc. The gasket 106 includes an outer ring 106a and an inner divider 106b. The outer ring of the gasket 106 is positioned around the first cavity 111 and the second cavity 131, while the divider 106b is positioned between the first cavity 111 and the second cavity 131. When the base plate 102 is coupled to the cover plate 104, the gasket 106 forms a fluid tight seal between a top surface of the base plate 102 and a bottom surface of the cover plate 104 with the portions of the base plate 102 and the cover plate 104 in contact with the gasket 106. In this manner, the gasket 106 fluidically isolates the two spaces formed between base plate 102 and the cover plate 104 that are disposed between the outer ring 106a and divider 106b of the gasket 106, thereby dividing the valve 100 into the pressure portion 110 and the suction portion 130. Thus, fluid communication between the suction portion 130 and the pressure portion 110 can occur only via the first channel 122 and the second channel 137 by flowing through the chamber formed between the depression 108 of the cover plate 104 and the membrane 109, as described herein.

A pressure plate 112 is disposed on the base plate 102 in the pressure portion 110. The pressure plate 112 includes a first anchoring portion 113, a first sealing portion 114 and a first biasing portion 115 connecting the first anchoring portion 113 and the first sealing portion 114. The pressure plate 112 can be formed from any suitable material, for example, metals (e.g., aluminum, stainless steel, alloys, etc.) and can be formed using any suitable method, for example etching, stamping, forging, etc.

The first anchoring portion 113 is configured to anchor the pressure plate 112 to the base plate 102. As shown in FIG. 1, the first anchoring portion 113 can include a slot or other opening configured to engage a first anchor 118 disposed on the base plate 102 (e.g., formed during the manufacturing the base plate 102) positioned in the pressure portion 110, such that the first anchoring portion 113 is immovably coupled to the first anchor 118. The cover plate 104 can include a matching cavity to receive at least a portion of the first anchor 118 such that first anchoring portion 113 is trapped and thereby fixedly disposed between the base plate 102 and the cover plate 104. In other embodiments, the first anchoring portion 113 can be fixedly coupled to the base plate 102 using adhesives, rivets or removable coupled to the base plate 102 using screws, nuts, bolts or any other suitable fastener or coupling mechanism.

The pressure plate 112 can be formed with a large pretension in the biasing portion 115. As shown in FIG. 1, the first biasing portion 115 includes a pair of beams extending from the first anchoring portion 113 to the first sealing portion 114. At least a portion of the first biasing portion 115 can be disposed within the first cavity 111. The first biasing portion 115 can be configured to flex or otherwise bend about the first anchoring portion 113 such that the first sealing portion 114 can be move proximal or distal relative to the base plate 102 and the cover plate 104 within the first cavity 111. The pretension in the first biasing portion 115 allows the first biasing portion 115 to operate like a leaf spring and flex or elastically bend about the first anchoring portion 113. This allows the first sealing member 114 to move between a first configuration and a second configuration, as described herein. The first biasing portion 115 exerts a biasing force on the first sealing portion 114 in the first configuration and/or the second configuration to urge the first sealing portion 114 to move proximal and/or distal relative to the base plate 102 and the cover plate 104.

In particular embodiments, the pretension in the first biasing portion 115 is configured to urge the first sealing portion 114 towards the first channel 122. In other embodiments, a biasing member (not shown) can be coupled to the first biasing portion 115 or the first sealing portion 114 to bias the first sealing portion 114 towards the first channel 122. For example, any suitable biasing member (e.g., a spring such as a helical spring, a Belleville spring, a leaf spring, etc.) can be disposed on the base plate 102 beneath the first biasing portion 115 or the first sealing portion 114 to bias the first sealing portion 114 towards the first channel 122.

The first sealing portion 114 is disposed in the first cavity 111 and configured to move between the first configuration and the second configuration within the first cavity 111. The first sealing portion 114 is substantially flat and is configured to form a fluid tight seal with the first channel 122. In some embodiments, a first sealing member 120 can be positioned proximal to an outlet of the first channel 122. The first sealing member 120 can, for example, include an O-ring. The first sealing member 120 is configured to form a first fluid tight seal with the first sealing portion 114 when the first sealing portion contacts the first sealing member 120 in the second configuration, as described herein.

The suction plate 132 is disposed in the suction portion 130. The suction plate 132 includes a second anchoring portion 133, a second sealing portion 134 and a second biasing portion 135 connecting the second anchoring portion 133 to the second sealing portion 134. The suction plate 132 can have a structure which is substantially similar to the pressure plate 112 and is therefore, not described in further detail herein.

As described with respect to pressure plate 112, the second biasing portion 135 included in the suction plate 132 also has a pretension. In particular embodiments, the pretension in the second biasing portion 135 is configured to urge the second sealing portion 134 towards the inlet passageway 136. In other embodiments, a biasing member (not shown) can be coupled to the second biasing portion 135 or the second sealing portion 134 to bias the second sealing portion 134 towards the inlet passageway 136. For example, any suitable biasing member (e.g., a spring such as a helical spring, a Belleville spring, a leaf spring, etc.) can disposed between the bottom surface of the cover plate and the second biasing portion 135 or the second sealing portion 134 to bias the second sealing portion 134 towards the inlet passageway 136.

As shown in FIG. 1, the second anchoring portion 133 can also include a slot or other opening configured to engage a second anchor 138 disposed on the base plate 102 in the suction portion 130 such that the second anchoring portion 133 is immovably coupled to the first anchor 138. As described with respect to the pressure plate 112, the cover plate 104 can also include a matching cavity to receive at least a portion of the second anchor 138 such that second anchoring portion 133 is trapped and thereby fixedly positioned between the base plate 102 and the cover plate 104. In other embodiments, the second anchoring portion 133 can be fixedly coupled to the base plate 102 using adhesives, rivets or removable coupled to the base plate 102 using screws, nuts or any other suitable fastener or coupling mechanism.

The pretension in the second biasing portion 135 allows the second biasing portion 135 to flex or bend about the second anchoring portion 133 to allow the second sealing portion 134 to move between the first configuration and the second configuration, as described in greater detail below. The second biasing portion 115 exerts a biasing force on the second sealing portion 134 in the first configuration and/or the second configuration to urge the second sealing portion 134 to move proximal and/or distal relative to the base plate 102 and the cover plate 104, within the second cavity 131.

The second sealing portion 134 is disposed in the second cavity 131. The second sealing portion 134 is substantially flat and is configured to form a fluid tight seal with the inlet passageway 136. In some embodiments, a second sealing member 140 can be positioned at an inlet of the inlet passageway 136. The second sealing member 140 can include, for example an O-ring. The first sealing member 120 is configured to form a second fluid tight seal with the second sealing portion 134 when the second sealing portion 134 contacts the second sealing member 140 in the second configuration, as described herein.

Figure 3:
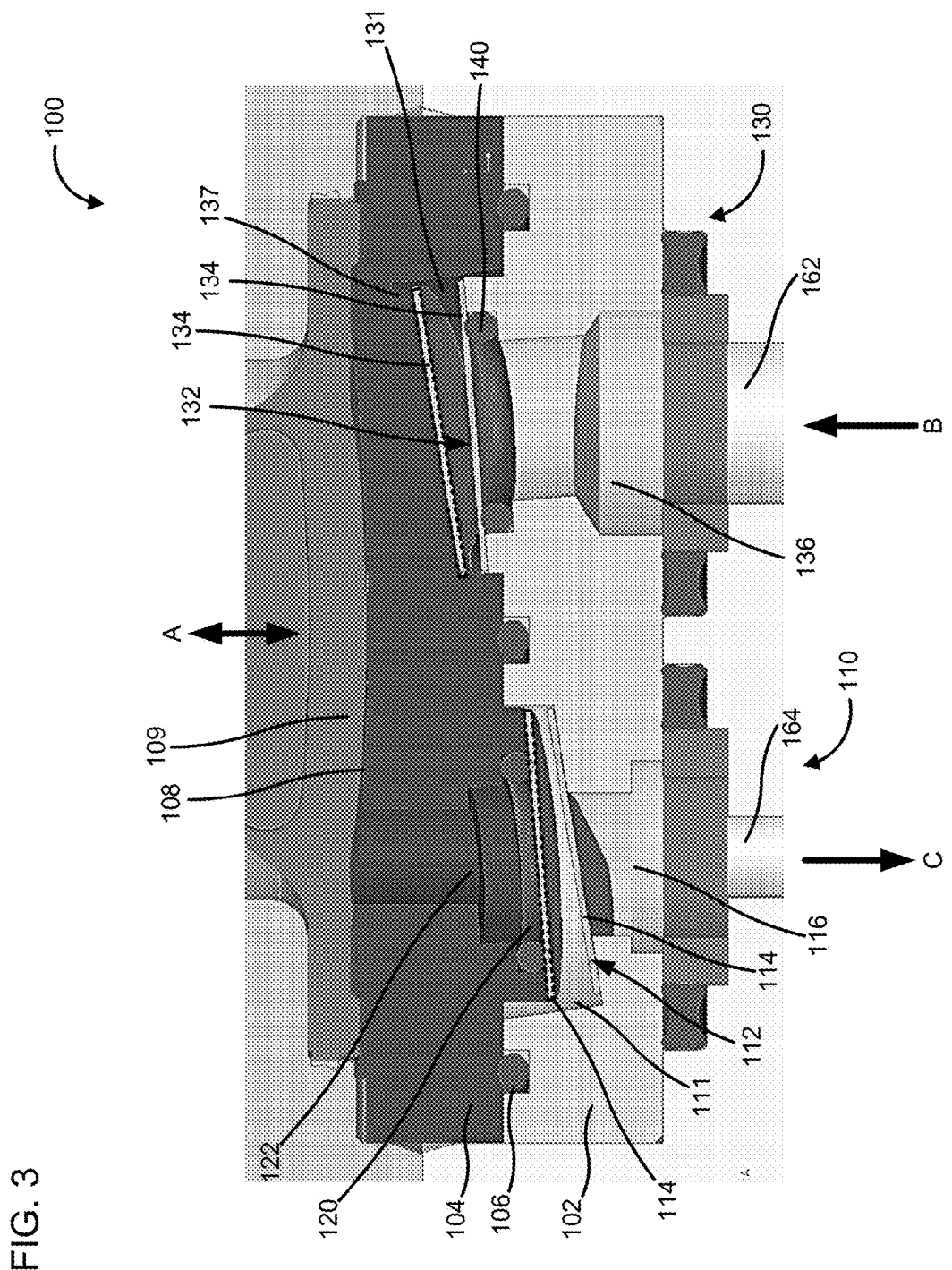
FIG. 3 is a side cross-section view of the valve of FIG. 1, showing the pressure plate and the suction plate in a first configuration and a second configuration.

The valve 100 can be included in pump to pump a fluid, for example an exhaust reductant (e.g., a diesel exhaust reductant). FIG. 3 shows a side cross-section of the valve 100 coupled to a membrane 109 of a pump, with the pressure plate 112 and the suction plate 132 in the first configuration and the second configuration. The membrane 109 is disposed on the top surface of the cover plate 104 distal to the base plate 102 such that the chamber is formed between the depression 108 of the cover plate 104 and a surface of the membrane 109 proximal to the top surface of the cover plate 104.

The inlet passageway 136 is fluidically coupled via an inlet conduit 162 to a reservoir or otherwise supply of fluid (e.g., an exhaust reductant storage tank). The outlet passageway 116 is fluidically coupled to an outlet conduit 164. The outlet conduit 164 can be in fluidic communication with a system (e.g., an SCR system). In one embodiment, the inlet conduit 162 and the outlet conduit 164 can include hoses or pipes. In another embodiment, the inlet conduit 162 and the outlet conduit 164 can be defined in a plate which is coupled to a bottom surface of the base plate 102 such that the inlet conduit 162 and the outlet conduit 164 are in fluidic communication with the inlet passageway 136 and the outlet passageway 116, respectively.

As described before, the valve 100 is movable between a first configuration and a second configuration. In the first configuration, the first sealing portion 114 of the pressure plate 112 is distal to the first channel 122 and the second sealing portion 134 of the suction plate 132 is proximal to the inlet passageway 136. In the second configuration, the first sealing portion 114 of the pressure plate 112 is proximal to the first channel 122, and the second sealing portion 134 of the suction plate 132 is distal to the inlet passageway 136.

Expanding further, in a first configuration the first sealing portion 114 of the pressure plate 112 (shown by solid line in FIG. 3) is distal to the first channel 122, and the second sealing portion 134 of the suction plate 132 (shown by solid line in FIG. 3) is proximal to the inlet passageway 136. For example, the pretension in the second biasing portion 135 can urge the second sealing portion 134 of the suction plate 132 towards the inlet passageway 136. In particular embodiments, the pretension in the second biasing portion 135 can be sufficient to urge the second sealing portion 134 towards the inlet passageway 136 such that the second sealing portion 134 forms the second fluid tight seal with the second sealing member 140 in the first configuration. In this way, the fluid is prevented from entering the second cavity 131 in the first configuration.

The first biasing portion 115 can be elastically bent or otherwise deformed about the first anchoring portion 112 in the first configuration to move the first sealing portion 114 distal from the first channel 122. In particular embodiments, the pretension in the first biasing portion 115 can be configured to urge the first sealing portion 114 towards the first channel 122 and thereby, form the first fluid tight seal with the first sealing member 120 to fluidly seal the first channel 122. A positive pressure may be applied on the first sealing portion 114 to move the first sealing portion 114 distal from the first channel 122, as described herein.

Furthermore, in the first configuration, at least a portion of the membrane 109 can be in contact with a top surface of the cover plate 104 such that there is little or no distance between the membrane 109 and the cover plate 104. Thus, the chamber which forms between the membrane 109 and the depression 108 of the cover plate 104 is not present in the first configuration.

The pump can be actuated to displace at least the portion of the membrane 109 in contact with the depression 108 distal from the depression 108, as shown by the arrow A. A space is thus produced between the membrane 109 and the depression 108 which defines the chamber. Furthermore, the displacement of the membrane 109 produces a negative pressure or suction in the first channel 122 and the second channel 137 of the cover plate 104.

The suction draws the first sealing portion 114 of the pressure plate 112 and the second sealing portion 134 of the suction plate 132 towards the first channel 122 and the second channel 137. This moves the valve 100 into the second configuration such that the first sealing portion 114 is proximal to the first channel 122 and the second sealing portion 134 is distal to the inlet passageway 136. The dotted lines in FIG. 3 show the first sealing portion 114 and the second sealing portion 134 in the second configuration. As described before, the movement of the first sealing portion 114 and the second sealing portion 134 can result in flexing or otherwise elastic bending of the first biasing portion 115 and the second biasing portion 135 about the first anchoring portion 113 and the second anchoring portion 133, respectively.

In the second configuration, the first sealing portion 114 contacts the first sealing member 120 forming a first fluid tight seal with the first sealing member 120, thereby fluidly sealing the first channel 122. Moreover, movement of the second sealing portion 134 distal from the inlet passageway 136 removes the second fluid tight seal such that the fluid can be drawn via the inlet conduit 162 and through the inlet passageway 136 into the second cavity 131, as shown by the arrow B.

The negative pressure further draws the fluid through the second channel 137 into the chamber. As the fluid flows under the membrane 109 in the chamber, the negative pressure inside the chamber reduces and is eventually removed. This also removes the negative pressure in the second channel 137 and thereby the suction on the second sealing portion 134. Removal of the negative pressure allows the flexed or elastically bent second biasing portion 135 to bend towards the inlet passageway 136. The second sealing portion 134 also moves towards the inlet passageway 136 and into the first configuration forming the second fluid tight seal with the second sealing member 140 thereby fluidly sealing the inlet passageway 136.

In some embodiments, the removal of the negative pressure can also urge the first biasing member to bend about the first anchoring portion 113 such that the first sealing portion 114 moves distal from the first channel 122. In other embodiments, in which the pretension in the first biasing portion 115 is configured to urge the first sealing portion 114 towards the first channel 122, the membrane 109 can also be moved proximal to the cover plate 104 to exert a positive pressure on the first channel 122. The positive pressure acts on the first sealing portion 114 to urge the pressure plate 112 into the first configuration.

Expanding further, movement of the membrane 109 towards the cover plate 104 minimizes the space between the membrane 109 and the cover plate 104. A positive pressure is created in the first channel 122 which overcomes the tension of the first biasing portion 115. The first biasing portion 115 flexes or elastically bends removing the first fluid tight seal. This allows the fluid to flow into the first cavity 111 and around the first sealing portion 114 into the outlet conduit 164 via the outlet passageway 116, as shown by the arrow C.

Figure 4:
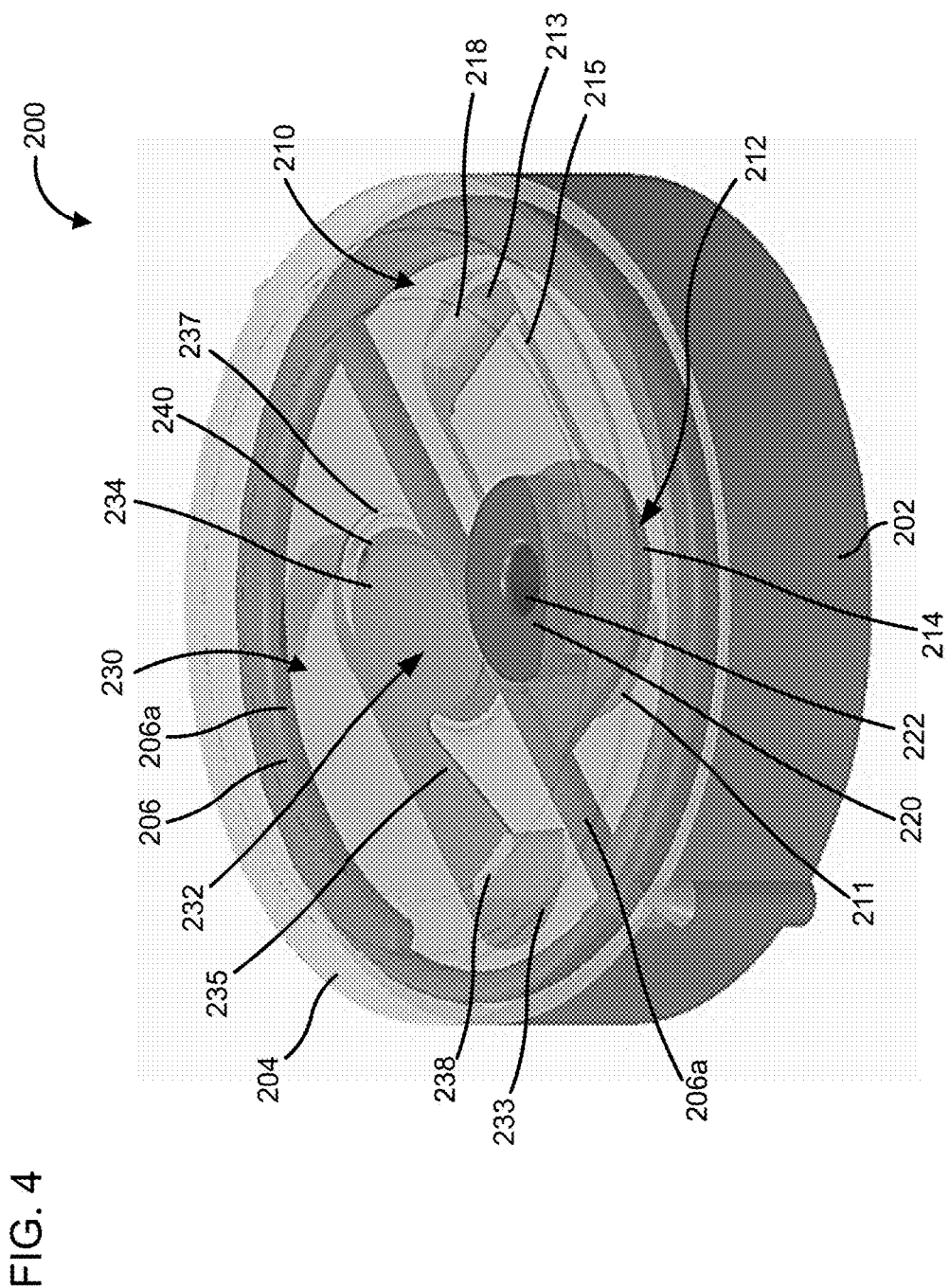
FIG. 4 is a perspective view of another embodiment of a valve that includes a base plate, a cover plate, a pressure plate and a suction plate.
Figure 5A:
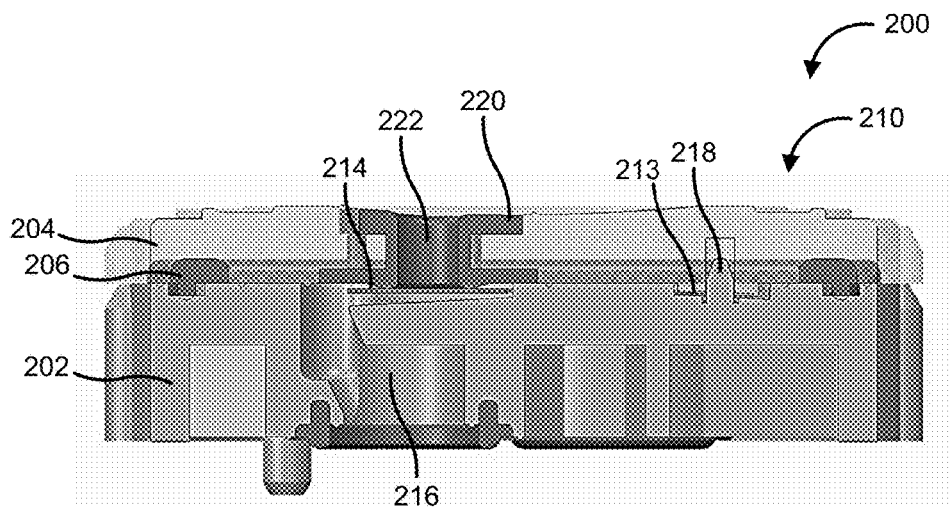
FIG. 5A is a side cross-section of a pressure portion of the valve of FIG. 4.
Figure 5B:
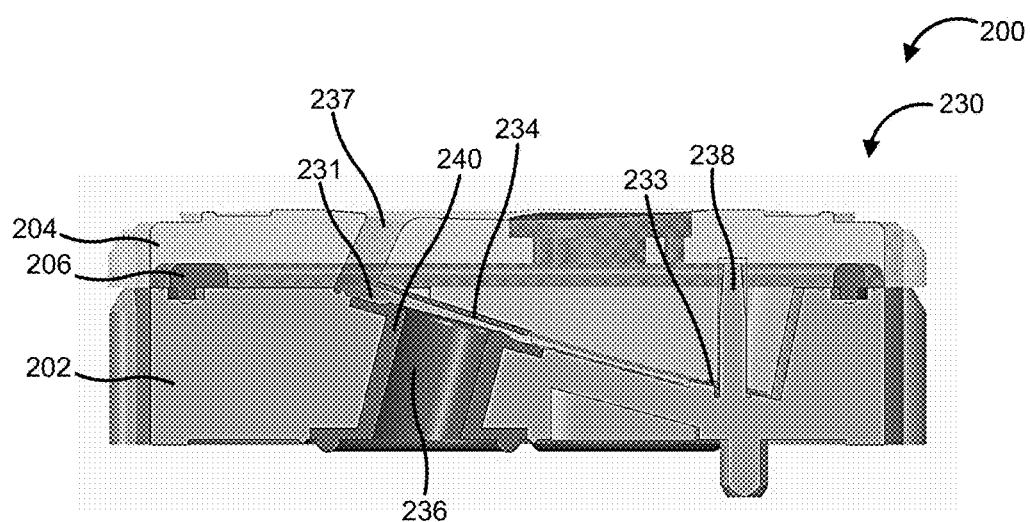
FIG. 5B is a side cross-section of the suction portion of the valve of FIG. 4.

FIG. 4 shows a perspective view of a valve 200 according to another embodiment. As with the valve in FIG. 1, the valve 200 can be included in a pump, for example a pump configured to deliver an exhaust reductant to an SCR system. The valve 200 includes a base plate 202, a cover plate 204, a pressure portion 210 that includes a pressure plate 212, and a suction portion 230 that includes a suction plate 232. FIG. 5A shows a side cross-section view of the pressure portion 210, and FIG. 5B shows a side cross-section of the suction portion 230 of the valve 200.

The base plate 202 defines an inlet passageway 236 and an outlet passageway 216 therethrough (FIGS. 2A and 2B). The base plate 202 is substantially similar to the base plate 102 with one notable exception. The inlet passageway 236 is defined by a second port 240 disposed through the base plate 202. The second port 240 can be formed from a soft but rigid material which can withstand corrosion from a harsh fluid (e.g., an exhaust reductant such as an aqueous urea solution). Suitable materials can include, for example rubber or polymers. The second port 240 is inserted through base plate (e.g., through a passageway defined in the base plate 202) to defined the inlet passageway 236. A portion of the second port 240 proximal to the cover plate 204 is configured to form a second fluid tight seal with a second sealing portion 234 of the second suction plate 232 such that an external sealing member (e.g., the second sealing member 140 included in the valve 100) is not required.

A first cavity 211 is also defined in the base plate 202 in the pressure portion 210. The first cavity 211 is configured to receive at least a portion of the pressure plate 212, as described herein, and is in fluidic communication with the outlet passageway 216.

The cover plate 204 is disposed on the base plate 202. The cover plate 204 defines a first channel 222 in the pressure portion 210 and a second channel 237 in the suction portion 230. At least a portion of the cover plate 204 between the first channel 222 and the second channel 237 can define a depression 208. The cover plate 204 is substantially similar to the cover plate 104 described with respect to the valve 100 with one exception. The first channel 222 is defined by a first port 220 disposed through the cover plate 204. The first port 220 can be formed from the same materials as the second port 240 and can withstand corrosion from the fluid (e.g., an exhaust reductant). The first port 220 is inserted through the cover plate 204 (e.g., through a passageway defined in the cover plate 204) and defines the first channel 222 therethrough. Furthermore, a portion of the first port 220 proximal to the base plate 202 is structured so as to form a first fluid tight seal with a first sealing portion 214 of the pressure plate such that an external sealing member (e.g., the first sealing member 120) is not required.

The second channel 237 is aligned with the outlet passageway 216 and is configured to allow fluid drawn into the chamber to be communicated back into the cover plate 204 and into the outlet passageway 216. The cover plate 204 also defines a second cavity 231 in the suction portion 230. The second cavity 231 is configured to receive at least a portion of the suction plate 232.

A gasket 206 is disposed on the base plate 202 and is positioned between the base plate 202 and the cover plate 204. The gasket 206 can be formed from a flexible and corrosion resistant material, for example rubbers. The gasket 206 includes an outer ring 206a and an inner divider 206b configured to divide the valve into the pressure portion 210 and the suction portion 230 which are fluidically isolated from each other through the valve 200, as described with respect to the valve 100.

A pressure plate 212 is disposed on the base plate 202 in the pressure portion 210. The pressure plate 212 includes a first anchoring portion 213, a first sealing portion 214 and a first biasing portion 215 connecting the first anchoring portion 213 and the first sealing portion 214. The first anchoring portion 213 can include a slot configured to engage a first anchor 218 disposed on the base plate 202 positioned in the pressure portion 210, such that the first anchoring portion 213 is immovably coupled to the first anchor 218. The pressure plate 212 can be substantially similar to the pressure plate 110 described with respect to the valve 100, and therefore, not described in further detail herein.

Figure 6:
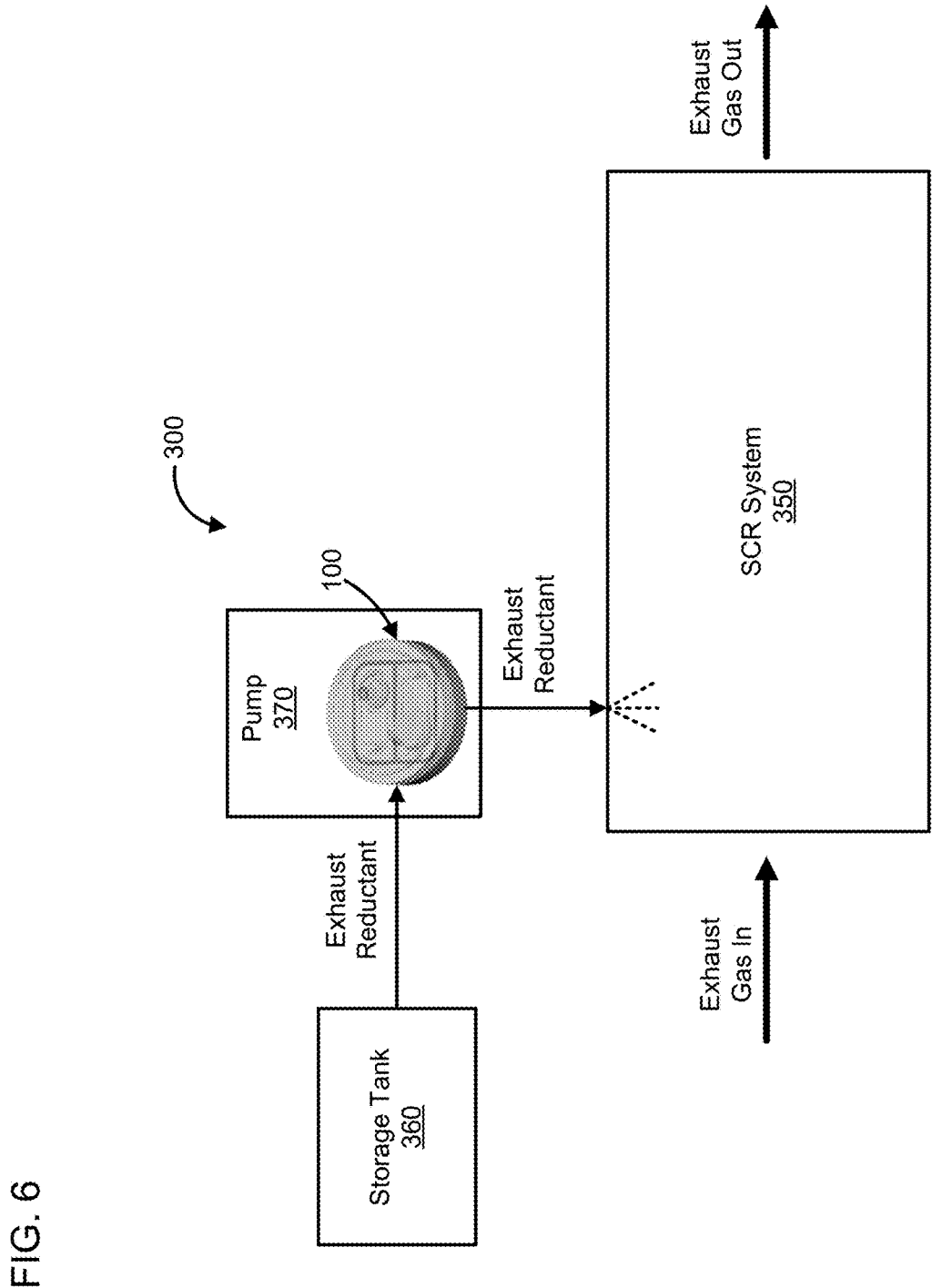
FIG. 6 is schematic block diagram of an aftertreatment system that comprises a pump which includes the valve of FIG. 1, according to another embodiment.

The suction plate 232 is disposed in the suction portion 230. The suction plate 232 includes a second anchoring portion 233, a second sealing portion 234 and a second biasing portion 235 connecting the second anchoring portion 232 to the second sealing portion 234. The second anchoring portion 233 can also include a slot configured to engage a second anchor 238 disposed on the base plate 202 in the suction portion 230 such that the second anchoring portion 233 is immovably coupled to the first anchor 138. The suction plate 232 is substantially similar to the suction plate 132 described with respect to the valve 100, and therefore not described in further detail herein The valve 100, 200 or any of the other valves described herein can be used in a wide variety of pumps, for pumping any fluid (e.g., water, diesel exhaust fluid, oil, solvents, etc.). For example, the valves 100, 200 or any other valve described herein can be included in a pump configured to pump an exhaust reductant from a storage tank to a SCR system included in an aftertreatment system. FIG. 6 shows a schematic flow diagram of an exemplary aftertreatment system 300. The aftertreatment system 300 includes a storage tank 360 for storing liquid exhaust reductant, a pump 370 that includes the valve 100, and an SCR system 350. The aftertreatment system 300 can be used to a treat an exhaust gas (e.g., a diesel exhaust gas) produced by an engine (e.g., a diesel engine) to remove any NOx gases included in the exhaust gas.

The storage tank 360 is configured to store an exhaust reductant. In some embodiments, in which the exhaust gas is a diesel exhaust gas, the exhaust reductant can include a diesel exhaust reductant. Such exhaust reductants can include, for example urea or an aqueous solution of urea (e.g., the exhaust reductant available under the tradename ADBLUE®).

The SCR system 350 is fluidly coupled to the engine and configured to receive an exhaust gas (e.g., a diesel exhaust gas) from the engine. The SCR system 350 includes one or more catalysts formulated to reduce the exhaust gas in the presence of the exhaust reductant and remove any NOx gases from the exhaust gas.

The pump 370 is positioned downstream of the storage tank 360 and upstream of the SCR system 250. While shown as including the valve 100, in other embodiments, the pump 370 can include the valve 200 or any other valve described herein. The pump 370 is fluidly coupled to the storage tank 360 and the SCR system 350. The pump 370 is configured to pump the exhaust reductant from the storage tank 360 to the SCR system 350 via the valve 100, as described before herein. For example, the pump 370 can be fluidly coupled to a fluid injector disposed on the SCR system 350 and configured to communicate the exhaust reductant into the SCR system 350.

Figure 7A:
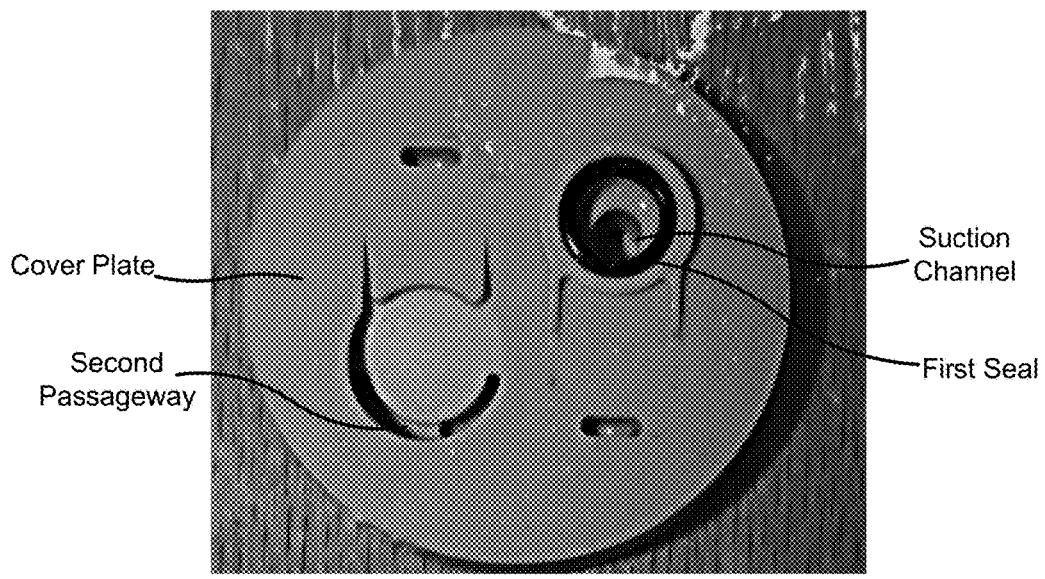
FIG. 7A is a bottom view of a cover plate.
Figure 7B:
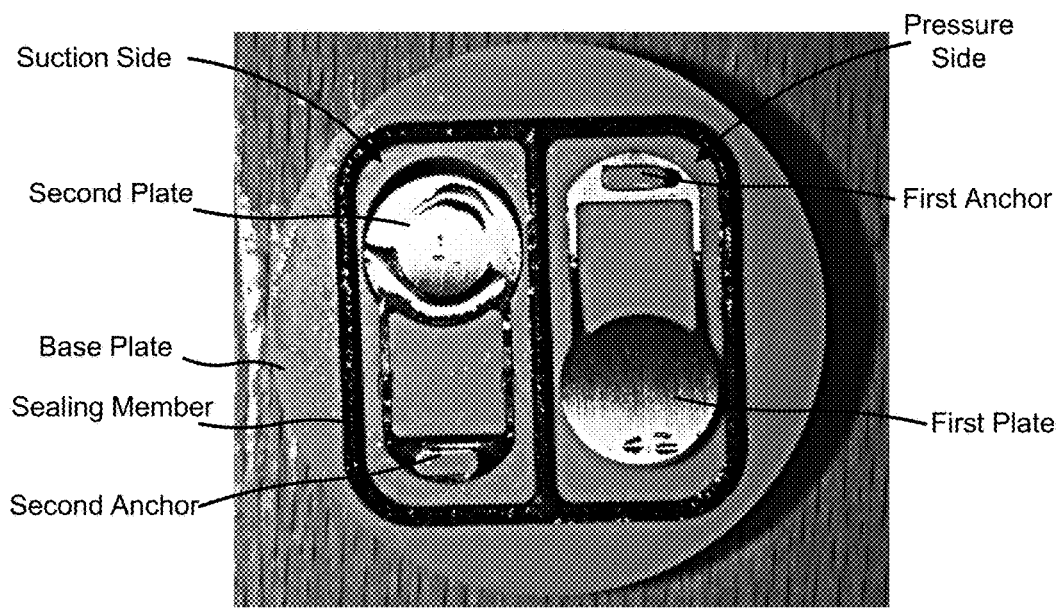
FIG. 7B is a top view of a base plate of a valve.

FIGS. 7A and 7B show optical images of a bottom surface of a cover plate and a top surface of a base plate of a valve, respectively. The valve is substantially similar to the valve 100 described herein. FIG. 7B shows a pressure plate and a suction plate disposed on the base plate and anchored at a first anchor and a second anchor respectively. FIG. 7A shows a second cavity, a first channel and a second channel defined in the cover plate, and a first sealing member disposed at an outlet of the first channel.

In one previous test of a valve constructed according to one exemplary embodiment, the valve was subjected to about 400 hours of operation and 9 freezing cycles. Slight corrosion of the tension arms of each of the pressure plate and the suction plate was observed after initial use, but no increase in corrosion was observed after 400 hours of use. Even after nine (9) freezing cycles, no visible damage to the valve was observed.

Figure 8A:
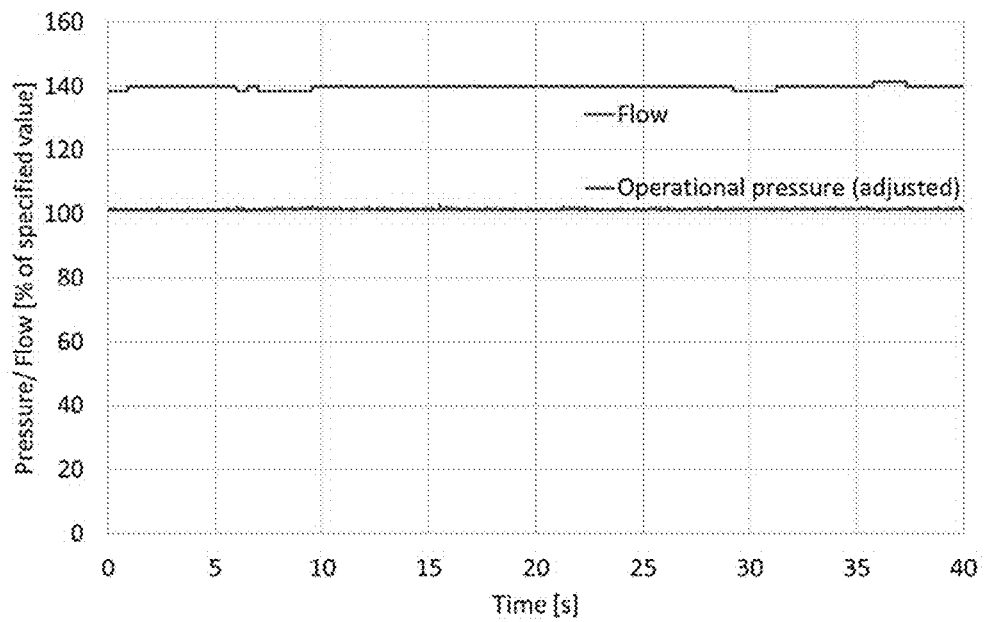
FIG. 8A is a plot of pumping profile of the valve of FIGS. 7A and 7B during operation at a nominal system pressure.

FIG. 8A is a plot of pressure profile of a pump which includes the valve of FIGS. 7A and 7B for operation at nominal system pressure. The y-axis scale denotes the pressure and flow as a percentage of a specified or desired value of a pressure and flow desired from the pump at a predetermined operating condition of the pump. The pump equipped with the valve of FIGS. 7A-B is able to build and maintain outlet side pressure at 100% of the specified (also referred to as "adjusted") value. The flow however, exceeds the specified or expected value of the flow at the specified pressure by 40%, indicating that the pump including the valve of FIGS. 7A-B is able to accommodate higher flow at the specified pressure. Thus, a lower pressure can be used to achieve a desired flow which can lower energy requirements and reduce costs.

Figure 8B:
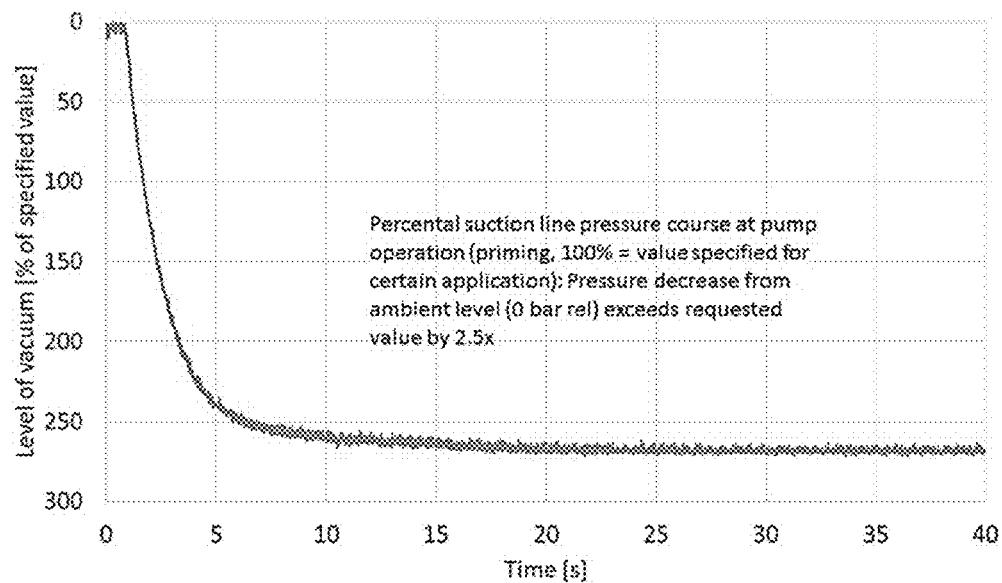
FIG. 8B is a plot showing suction developed in a pump that includes the valve, demonstrating the self-priming ability which can be achieved with the valve of FIGS. 7A and 7B.

FIG. 8B is a plot of suction developed in a pump that includes the valve, demonstrating self priming ability which can be achieved with the valve. The y-axis denotes the level of the vacuum as a percentage of a specified value of the vacuum at a predetermined operating condition of the pump. The pump equipped with the valve is able to create a vacuum pressure in a suction line fluidly coupled to the pump thereby allowing self priming up to a certain head height. As seen in FIG. 8B, at a requested or otherwise desired negative pressure of 0 bar, the actual negative pressure achieved by the pump including the valve is about 2.5× (about 250%) lower than the requested pressure. This demonstrates, that valve is capable of providing sufficient vacuum to draw a fluid (e.g., water or exhaust reductant) from a reservoir at a specified negative pressure.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

What is claimed is:

1. A pump, comprising:
   a valve comprising:
      a base plate defining an inlet passageway and an outlet passageway, the inlet passageway included in a suction portion of the valve and the outlet passageway included in a pressure portion of the valve,
      a cover plate disposed over the base plate, the cover plate defining a first channel in the pressure portion and a second channel in the suction portion,
      a pressure plate disposed on the base plate in the pressure portion, the pressure plate including a first anchoring portion, a first sealing portion, and a first biasing portion connecting the first anchoring portion and the first sealing portion, a suction plate disposed on the base plate in the suction portion, the suction plate including a second anchoring portion, a second sealing portion, and a second biasing portion connecting the second anchoring portion and the second sealing portion, a first sealing member positioned proximal to an outlet of the first channel, the first sealing member configured to form a first fluid tight seal with the first sealing portion in a second configuration, and a second sealing member positioned at an inlet of the inlet passageway within the base plate, the second sealing member configured to form a second fluid tight seal with the second sealing portion in a first configuration; and a membrane disposed on the cover plate, the membrane and the cover plate defining a chamber therebetween, the pressure portion and the suction portion in fluidic communication through the first channel and the second channel via the chamber, wherein the pump is movable between the first configuration in which the membrane is proximal to the cover plate, the first sealing portion of the pressure plate is distal to the first channel such that a fluid is expelled from the chamber into the outlet passageway through the first channel and the second sealing portion of the suction plate is proximal to the inlet passageway and fluidly seals the inlet passageway, and the second configuration in which the membrane is distal to the cover plate, the first sealing portion is proximal to the first channel and fluidly seals the first channel, and the second sealing portion is distal to the inlet passageway such that the fluid is drawn into the chamber from the inlet passageway via the second channel.

2. The pump of claim 1, wherein movement of the first sealing portion and the second sealing portion between the first configuration and the second configuration results in a flexing of the first biasing portion about the first anchoring portion, and a flexing of the second biasing portion about the second anchoring portion, respectively.

3. The pump of claim 2, wherein movement of the membrane distal to the cover plate in the second configuration produces a negative pressure in the first channel and the second channel, the negative pressure moving the first sealing portion proximal to the first channel, the negative pressure also moving the second sealing portion distal from the inlet passageway, the movement of the second sealing portion allowing a fluid to be drawn into the suction portion via the inlet passageway.

4. The pump of claim 3, wherein movement of the membrane proximal to the cover plate in the first configuration removes the negative pressure in the first channel, the removing allowing the first biasing portion to bend away from the first channel and move the first sealing portion distal from the first channel, the removing further allowing the second biasing portion to bend towards the inlet passageway and move the second sealing portion towards the inlet passageway to seal the inlet passageway, the movement of the first sealing portion allowing at least a portion of the fluid to be communicated from the chamber into the outlet passageway via the first channel.

5. The pump of claim 1, wherein at least a portion of the cover plate between the first channel and the second channel defines a depression, the depression structured to form the chamber between the membrane and cover plate.

6. The pump of claim 1, wherein a first cavity is defined in the base plate, the first sealing portion movable between the first configuration and the second configuration within the first cavity.

7. The pump of claim 6, wherein a second cavity is defined in the cover plate, the second sealing portion movable between the first configuration and the second configuration within the second cavity.

8. The pump of claim 1, wherein the valve further comprises:

a gasket disposed on the base plate, the gasket configured to divide the valve into the pressure portion and the suction portion.

9. An aftertreatment system, comprising:

a selective catalytic reduction system configured to receive an exhaust gas from an engine, the selective catalytic reduction system including at least one catalyst formulated to reduce the exhaust gas;

a storage tank configured to store an exhaust reductant for providing to the selective catalytic reduction system; and the pump according to claim 1, wherein the pump is fluidly coupled to the storage tank and the selective catalytic reduction system and configured to pump the exhaust reductant from the storage tank to the selective catalytic reduction system.

10. The aftertreatment system of claim 9, wherein movement of the membrane distal to the cover plate in the second configuration produces a negative pressure in the first channel and the second channel, the negative pressure moving the first sealing portion proximal to the first channel, the negative pressure also moving the second sealing portion distal from the inlet passageway, the movement of the second sealing portion allowing a fluid to be drawn into the suction portion via the inlet passageway.

11. The aftertreatment system of claim 10, wherein movement of the membrane proximal to the cover plate in the first configuration removes the negative pressure in the first channel, the removing allowing the first biasing portion to bend away from the first channel and move the first sealing portion distal from the first channel, the removing further allowing the second biasing portion to bend towards the inlet passageway and move the second sealing portion towards the inlet passageway to seal the inlet passageway, the movement of the first sealing portion allowing at least a portion of the fluid to be communicated from the chamber into the outlet passageway via the first channel.

* * * * *